Sept. 8, 1964    B. A. HUNN    3,147,627
RATE GYROSCOPES
Filed Nov. 18, 1960

Inventor
Bernard Albert Hunn
By Moses, Nolte & Nolte
Attorneys

United States Patent Office 3,147,627
Patented Sept. 8, 1964

3,147,627
RATE GYROSCOPES
Bernard Albert Hunn, West Byfleet, England, assignor to Vickers-Armstrongs (Aircraft) Limited, London, England, a British company
Filed Nov. 18, 1960, Ser. No. 70,331
Claims priority, application Great Britain Nov. 19, 1959
11 Claims. (Cl. 74—5.6)

The present invention relates to rate gyroscopes.

As is well known, rate gyroscopes are commonly employed in aircraft and guided missiles for measuring angular velocities of the body about predetermined axes. Control systems are now frequently designed to utilize such measurements and it is consequently necessary to provide rate gyroscopes for the pitch, yaw and bank movements of the body. A conventional rate gyroscope is adapted to measure rate of turn about only one axis and therefore a separate rate gyroscope must be employed for measurement of each of the above-mentioned movements.

It is an object of the present invention to provide a gyroscope which can be used for the measurement of rates of turn about two perpendicular axes of the body.

According to the present invention, there is provided a gyroscopic apparatus comprising a rotor, a part of which undergoes resilient deformation or deflection when the rotor is subjected to precessional torque, said part having or producing or being associated with means having or producing an electrical characteristic or quantity which varies in accordance with variations in the amplitude of said deformation or deflection.

One embodiment of the invention will now be described by way of example with reference to the accompanying drawings in which.

Figure 1:
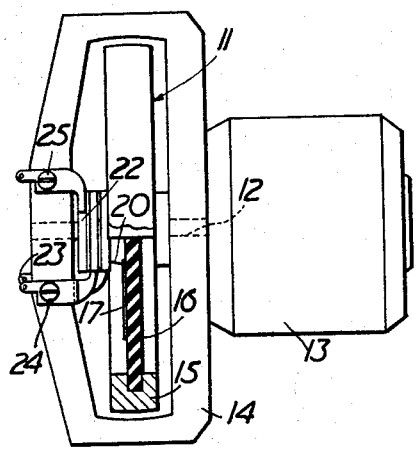
FIG. 1 is a side elevation of gyroscopic apparatus according to this invention.
Figure 2:
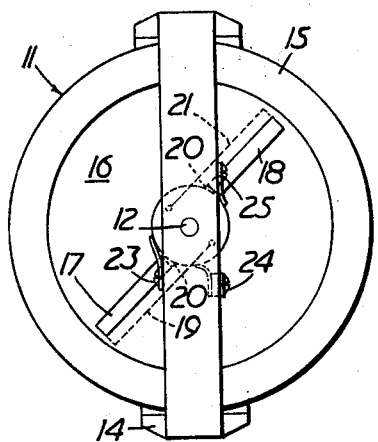
FIG. 2 is a plan view of the gyroscope shown in FIG. 1.

Referring first to FIGS. 1 and 2, there is shown a rate-of-turn gyroscope comprising a rotor 11 mounted on an output shaft 12 of an electric motor 13, and rotatably supported in a rigid bearing cage 14 which is secured as shown to the casing of the electric motor 13. The rotor 11 comprises a heavy metal annulus 15 carried by a disc 16 of rubber contained within the annulus 15 and supported at its centre on the rotor axle constituted by the motor output shaft 12. Upon the front surface of the resilient disc 16 there are attached two elongate piezoelectric crystals 17 and 18 which extend as shown in radially opposite directions. Each of the crystals 17 and 18 is provided in known manner with current collecting surfaces and electric connections to these surfaces are made by conductors 19, 20 and 21, the former two of which lead directly to two contact rings of a commutator 22, and the latter one of which serves to connect one of the current collecting surfaces of one of the crystals to the corresponding current collecting surface of the other of the crystals and further to connect these surfaces to the third of the rings of the commutator 22. The commutator 22 is provided with three wipers 23, 24 and 25, secured to the bearing cage 14.

Figure 3:
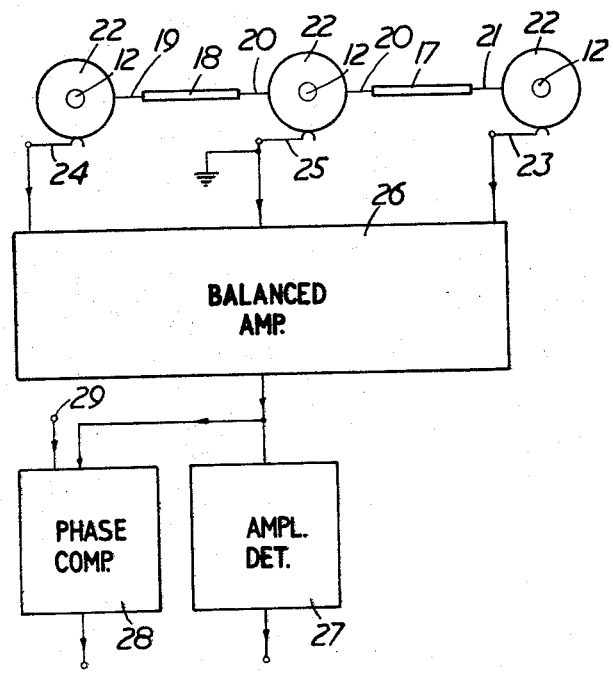
FIG. 3 is a block schematic diagram of electrical apparatus used with the gyroscopic apparatus shown in FIGS. 1 and 2.

Referring now to FIG. 3, the piezoelectric crystals 17 and 18 are connected by means of the commutator 22 and wipers 23, 24 and 25, to a balanced amplifier 26, the output of which is a measure of the difference between the amplitudes of the two signals applied to it from the crystals 17 and 18. The difference signal from the balance amplifier 26 is applied to an amplitude detector 27, which generates a D.C. signal which varies in accordance with variations in the maximum amplitude of the difference signal. The difference signal from the balanced amplifier 26 is also applied to a phase comparator 28, which is of known kind and which generates an output D.C. signal, the magnitude of which is a measure of the phase difference between the signal from the amplifier 26 and a datum signal applied to an input terminal 29 derived in a manner hereinafter described.

Where the apparatus is to be used for measuring say pitch and yaw of an aircraft, it is mounted in the aircraft with the rotor axis in the direction of the aircraft body axis, and is constrained to follow the movements of the aircraft.

To facilitate the description of the operation of the apparatus, it is first assumed that the aircraft pitches. This movement is transferred to the rotor 11 and precessional torque is set up in the rotor 11 about an axis at right angles to the spin and pitch axes. This torque results in a deformation of the rubber disc 16, and the metal annulus 15 takes up a position in which it is rotated in a plane slightly inclined to the plane at right angles to the rotor axis. As the rotor 11 is constantly spinning each elementary part of the disc 16 first undergoes bending in one sense and then bending in the opposite sense, and this alternation of bending occurs at the spin frequency of the rotor. Such bending variations are transformed by the opposed crystals into electrical signals, each of which is oscillatory at the spin frequency, with a maximum amplitude corresponding to maximum bending of the disc at the crystal position. As the crystals are located at diametrically opposite positions of the disc, the oscillatory signals are 180° out of phase. Subtraction of one from the other in the amplifier 26, therefore results in a double-amplitude output signal, which is fed to the amplitude detector 27 and phase comparator 28.

The amplitude of the output signal from the amplifier 26 is a measure of the magnitude of the precessional torque and hence to the rate of turn. The phase of the signal in relation to a fixed phase signal applied to terminal 29, provides an indication of the direction of the axis about which the applied torque acts and hence the direction of the rate-of-turn axis. The motor 13 in the present embodiment is a 400 c./s. A.C. motor driven from an A.C. electrical supply and a fixed phase signal of a frequency equal to the rotor spin frequency is obtained from the A.C. supply.

It will now be assumed that the aircraft is subjected to yaw movement. Assuming that the phase datum position is arranged to indicate zero phase for a signal resulting from a pitch movement then clearly the signal representing the yaw movement will be 90° out of phase. The signal from the phase comparator 28, which may be applied to an indicator or to another signal utilisation unit, represents this phase angle. It will be apparent that the aircraft may be subjected to yaw and pitch movements simultaneously. In these circumstances the resultant of such movements is represented by the output signal from the detector 27, and the angle between the rate-of-turn axis and the pitch axis is represented by the output signal from the comparator 28.

The output signal from the detector 27 may if desired be resolved into component pitch and yaw signals by feeding it to a resolving unit to which is also applied the output signal from the phase comparator 28.

It will be appreciated that stresses in addition to the precessional torques are set up in the rotor 11 and must be accounted for and their effect on the electrical outputs eliminated. The first is the radial tensile stress resulting from centrifugal force. By placing the crystals at diametrically opposite positions and subtracting the output signals the effects of such stresses are eliminated. The second is the bending of the disc 16 which is created by accelerations of the rotor 11 in the direction of the rotor axis. The bending from this cause is in the same sense at the two crystal positions and its effect on the electrical output signal is also eliminated by subtracting one of the signals from the other.

The noise level in the electrical circuits is determined by the bearing rumble and the structural resonances of the rotor itself. These can be significantly reduced by introducing structural damping in the rotor and by using reasonably high grade bearings.

The interia of the rotor 11 can be provided by a body with two of its principal moments of inertia equal, as in the annulus hereinbefore described or by a body with only one significant principal moment of inertia, such as a rod or dumbbell. The rod may be formed entirely of resilient material and rotatably mounted at its mid-point, or a central portion only may be resilient and the ends formed of a heavy metal. In the case of the dumbbell, the ends may be heavy metal spheres and the rod portion be composed of a resilient material.

Electrical resistance strain gauges may if desired be employed instead of piezoelectric crystals. In like manner, they are attached to or embodied in a resilient part of the rotor. In yet another alternative arrangement, the crystals or gauges may constitute the said resilient parts.

What I claim as my invention and desire to secure by Letters Patent is:

1. Gyroscopic apparatus comprising rotor means including a rigid annulus, a rotor shaft, and a flexible mounting connecting the annulus to the rotor shaft, said annulus being concentric with the shaft and lying in a plane at right angles thereto when said mounting is undeflected, and signal generating means including a pair of elements having electrical characteristics which vary with the deformation thereof, said elements being supported exclusively by two oppositely directed, radially extending resilient portions of said flexible mounting so as to be subject to deformation thereof.

2. Apparatus according to claim 1, wherein said elements are piezoelectric crystals.

3. Apparatus according to claim 2, including an amplifier and means for applying the signals generated by said crystals in opposition to said amplifier.

4. Apparatus according to claim 3, including a cage for said rotor, and wherein said signal applying means comprises a commutator carried on said rotor shaft and wipers mounted on said rotor cage for contacting said commutator.

5. Apparatus according to claim 1, wherein said elements comprise electrical resistance strain gauges, and wherein said apparatus further includes a bridge circuit and means connecting said resistance gauges in opposite arms of the bridge circuit.

6. Apparatus according to claim 1, wherein said resilient mounting comprises a disc of resilient material supported at its center on said rotor shaft and connected to the inner periphery of said annulus.

7. Apparatus according to claim 6, including a motor and a casing therefor, and wherein said rotor is operatively connected to said motor, and said rotor cage is rigidly secured to said motor casing.

8. Apparatus according to claim 1, wherein said signal generating means comprises means for deriving from the variations in said electrical characteristic of each element an electrical signal representative of said variations, a signal utilization circuit, and means for applying said signals in opposition to the signal utilization circuit.

9. Apparatus according to claim 8 wherein said signal utilization circuit includes an amplitude measuring device for generating an output signal representative of the variations in maximum amplitude of the resultant of the signals applied to said signal utilization circuit.

10. Apparatus according to claim 9, wherein said signal utilization circuit includes a phase detecting device for detecting the phase of the resultant of said signals with respect to a fixed phase signal generated by said rotor.

11. Gyroscopic apparatus comprising a rotor shaft, means for rotating said shaft, a rigid annulus positioned concentrically with respect to said shaft, a disc-like flexible mounting connected at its center to said rotor shaft and at its outer periphery to the inner periphery of said annulus, and signal generating means exclusively supported by fixed portions of said mounting, said last-named means being responsive to the deformation of said mounting means and the rotation of said rotor shaft for generating a cyclical, electrical signal.

References Cited in the file of this patent

UNITED STATES PATENTS

| | | |
|---|---|---|
| 2,716,893 | Birdsall | Sept. 6, 1955 |
| 2,951,376 | Lahde | Sept. 6, 1960 |